United States Patent [19]

Tsukimi

[11] Patent Number: 5,495,459
[45] Date of Patent: Feb. 27, 1996

[54] INTERACTIVE TRAINING SYSTEM AND TRAINING MATERIAL THEREFOR

[75] Inventor: Tsuyosi Tsukimi, Tokyo, Japan

[73] Assignee: Pioneer Electronic Corporation, Tokyo, Japan

[21] Appl. No.: 248,359

[22] Filed: May 24, 1994

[30] Foreign Application Priority Data

May 31, 1993 [JP] Japan .................... 5-129178

[51] Int. Cl.$^6$ .................... G11B 27/10
[52] U.S. Cl. .................... 369/48; 235/472
[58] Field of Search .................... 235/472; 369/48

[56] References Cited

U.S. PATENT DOCUMENTS 4,481,412  11/1984  Fields ...................... 235/472
4,831,610  5/1989   Hoda ........................ 369/48

*Primary Examiner*—Harold Pitts

*Attorney, Agent, or Firm*—Kane, Dalsimer, Sullivan, Kurucz, Levy, Eisele and Richard

[57] ABSTRACT

An interactive training system is operated in combination with a training material including first recording medium for recording main training information composed of moving pictures, sub training information relating to the main training information and notice information, and second recording medium for recording reproduction control information. The system includes: reproduction unit for reproducing one of the main training information and the sub training information to be displayed on a display; input unit for reading out the reproduction control information from the second recording medium; and control unit for controlling the reproduction unit in accordance with the reproduction control information supplied from the input unit. The notice information is displayed on the display with the main training information when the sub training information corresponding to the main training information is recorded in the first recording medium.

12 Claims, 7 Drawing Sheets

MP: MOVING PICTURE
SP: STILL PICTURE

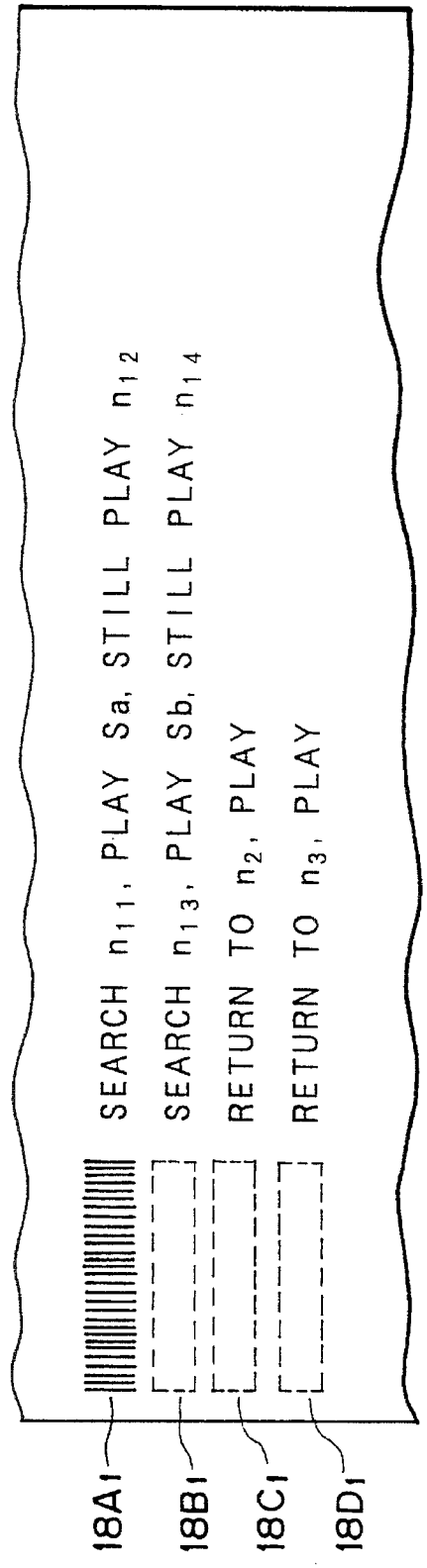
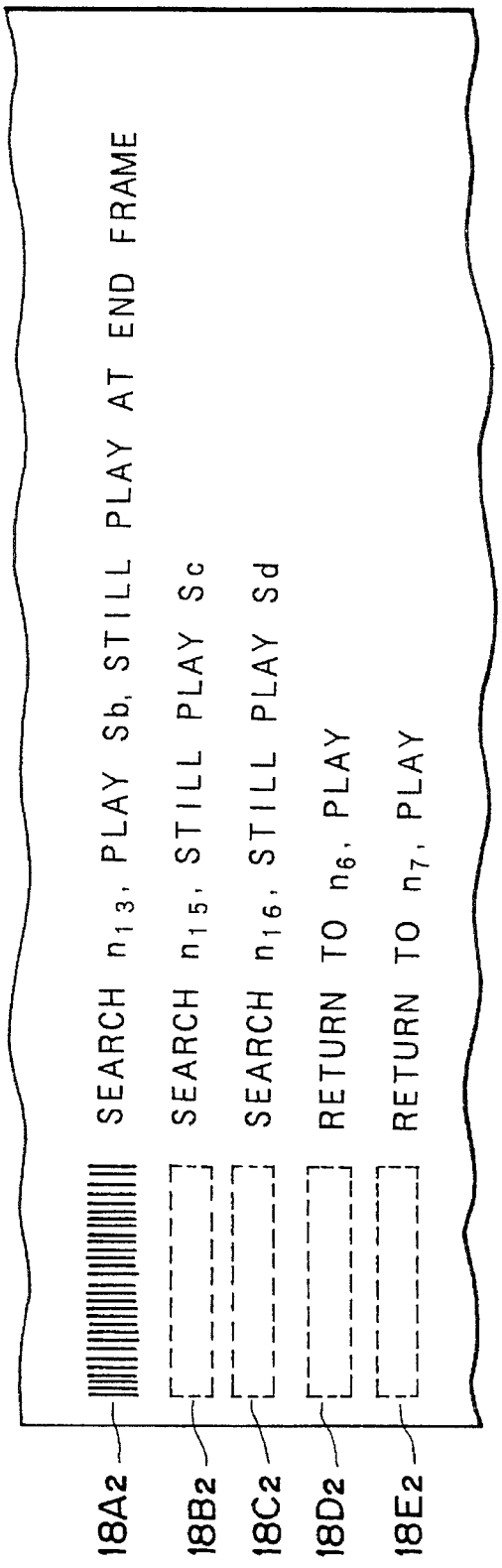

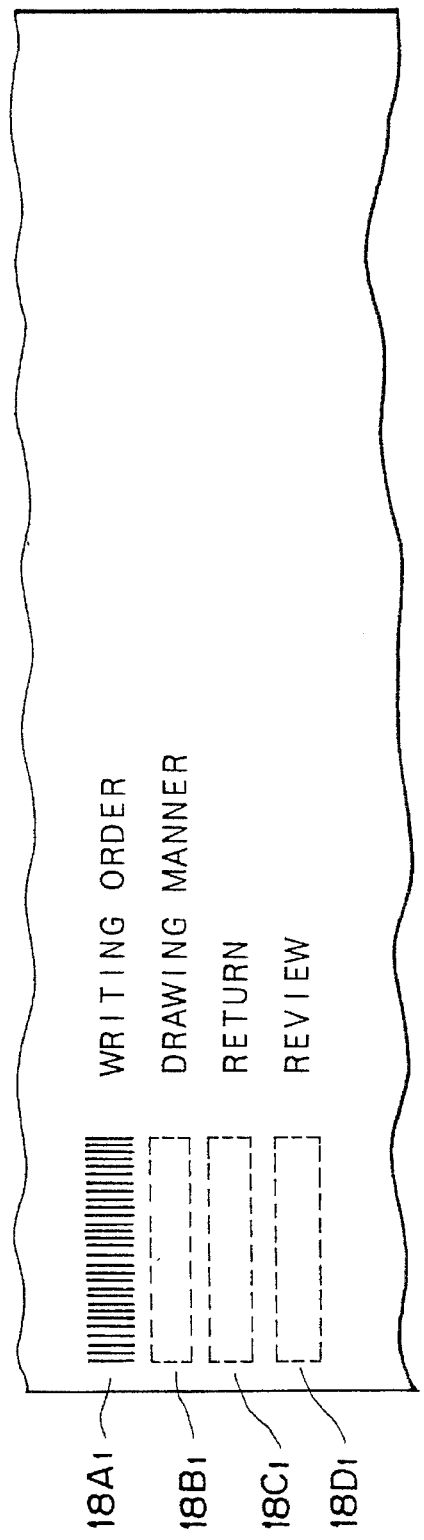
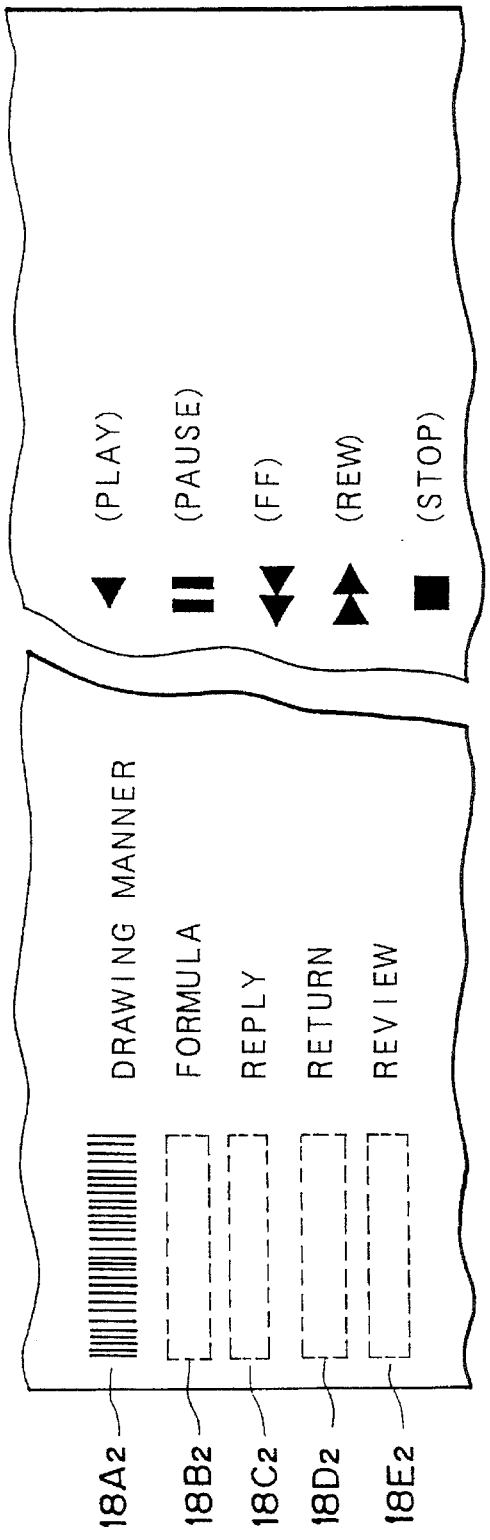

INTERACTIVE TRAINING SYSTEM AND TRAINING MATERIAL THEREFOR

BACKGROUND OF THE INVENTION

1. Field of the Invention

This invention relates to an interactive training system utilizing information recording medium such as Laser Disk (LD) and training material used in combination with the training system.

2. Description of the Prior Art

Recently, electrical publishing utilizing optical information recording medium such as CD-ROM (Compact Disk Read Only Memory), CD-I (Compact Disk Interactive) or video disk including LD (Laser Disk) is put into practice. Encyclopedia, dictionary, telephone directory, catalog and various kinds of training materials are known as examples of electrical publication. Contents of electrical publication is read out and displayed on a display by a search system (player) for exclusive use, and necessary information is output in a form of sound and/or picture in response to user's instruction.

In a known video disk search system, user instructs operation commands or information selection commands to the system in various way, and a system utilizing bar code input system is proposed in view of convenience in operation. In connection with such a bar code system, inventors of the present invention have proposed a video disk search system disclosed in Japanese Laid-Open Patent Publication No. 62-204675 and controlling methods for controlling apparatus for reproducing information recording medium disclosed in Japanese Laid-Open Patent Publications No. 63-195862, No. 63-195863 and No. 63-195864. In addition, U.S. Pat. Nos. 4,481,412 and 4,329,684 disclose a bar code input system, and U.S. Pat. No. 4,333,152 and Japanese Laid-Open Patent Publication No. 3-116274 disclose techniques of searching and selecting pictures.

The documents referred above disclose systems in which user selects information or operation using a bar code input system, human voice or light pen, etc., and it is mentioned that these systems are distinctive or characteristic in their "interactive" operation. However, in these systems, interaction between user and system is one-to-one correspondence. Namely, system performs one operation in response to one instruction given by user, and when the operation is executed the system becomes waiting status waiting for another instruction. According to these systems, picture information is composed of main picture information and supplemental picture information, and each of them are composed of fragmentary pictures. In many cases, main picture information merely functions as list or table of contents of supplemental pictures. In operation, user sees main picture information which provides a table of contents information of supplemental picture information, and merely selects one of supplemental pictures. When user selects one of pictures, corresponding fragmentary picture appears. Then, the system becomes status of waiting for another selection and do nothing until user gives another instruction. When user selects another picture, corresponding picture appears. In this manner, user selects one picture information, and one fragmentary picture appears in response. In this view, although such a system is mentioned as "interactive", operations of the system are all fragmentary or scrappy. In other words, such a system is nothing more than a mere picture selection system selecting one of fragmentary pictures one after another.

SUMMARY OF THE INVENTION

It is an object of the present invention to provide an interactive training system and training material in which main training information has story of a certain kind and supplemental training information relating to the main training information can be arbitrarily read out without harming or marring story of the main training information.

According to one, aspect of the present invention, there is provided a training material including first recording medium and second recording medium, the first recording medium including: main training information recording area for recording main training information comprised of moving pictures and notice information on time basis, the main training information recording area including area for recording the notice information together with the main training information; and sub training information recording area for recording sub training information relating to the main training information recorded in the main training information recording areas, the notice information indicating presence of the sub training information corresponding to the main training information recorded in the main training information recording area; and the second recording medium including reproduction control information recording area for recording reproduction control information for controlling reproduction of the main training information and the sub training information, the notice information being assigned to the sub training information recording area.

According to another aspect of the present invention, there is provided an interactive training system operated in combination with a training material including first recording medium for recording main training information composed of moving pictures, sub training information relating to the main training information and notice information, and second recording medium for recording reproduction control information, the system including: reproduction unit for reproducing one of the main training information and the sub training information to be displayed on a display; input unit for reading out the reproduction control information from the second recording medium; and control unit for controlling the reproduction unit in accordance with the reproduction control information supplied from the input unit, wherein the notice information is displayed with the main training information when the sub training information corresponding to the main training information is recorded in the first recording medium.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIGS. 6A and 6B are diagrams illustrating examples of bar codes and control commands represented by the textbook; and FIGS. 7A–7C are diagrams illustrating other examples of bar codes and control commands represented by the textbook.

DESCRIPTION OF THE PREFERRED EMBODIMENT

Figure 1:
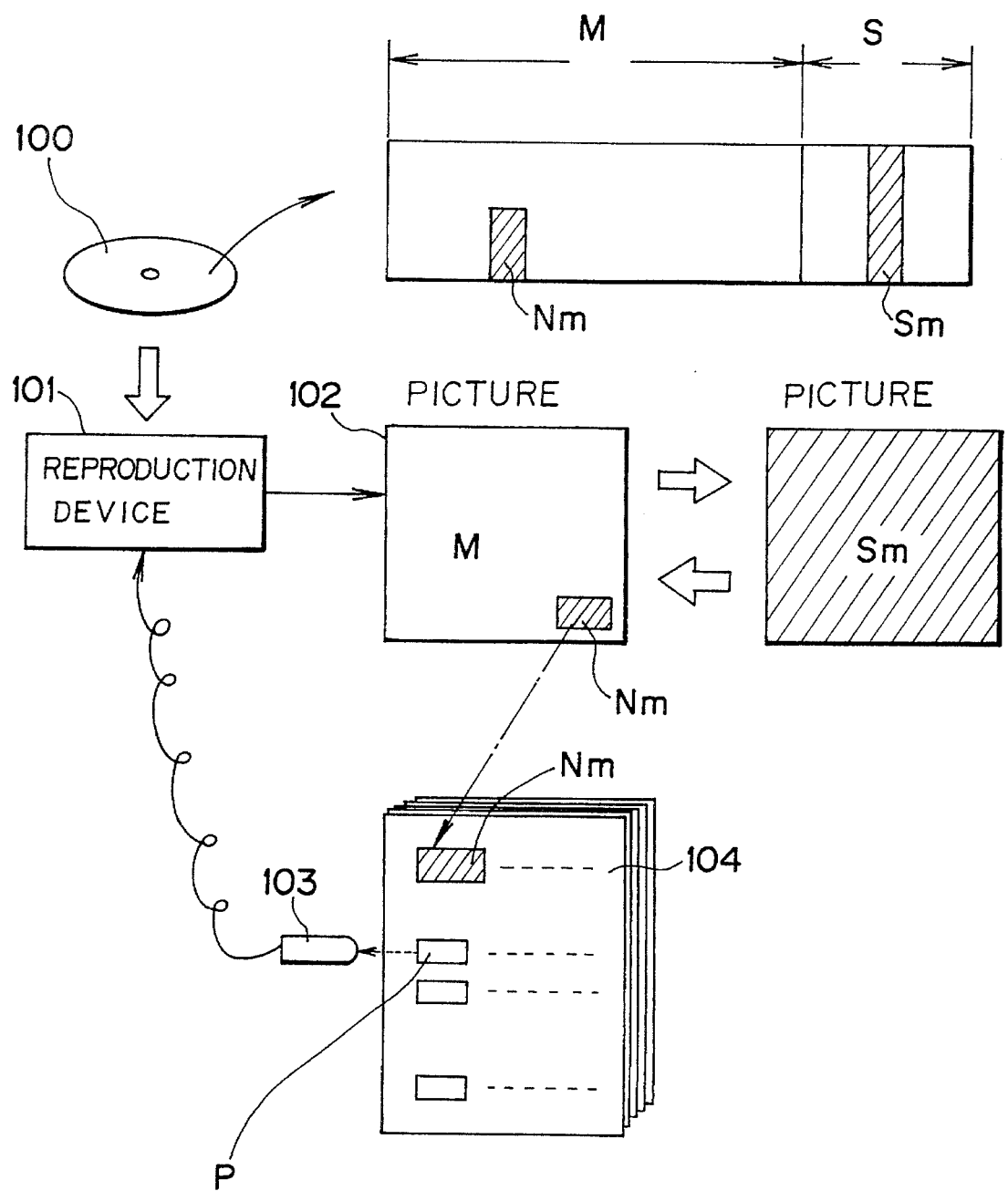
FIG. 1 is a diagram illustrating a fundamental concept of the present invention.

First of all, a fundamental concept of the present invention will be described with reference to FIG. 1. As illustrated in FIG. 1, training material according to the present invention includes a first recording medium 100 and a second recording medium 104. On the first recording medium 100, main training information M and sub training information S are recorded. Main training information M includes notice information Nm. On the second recording medium 104, reproduction control information P corresponding to notice information Nm is recorded in a manner being readable by an input device 103. When the first recording medium 100 is loaded into a reproduction device 101 and reproduction is started, main training information M is displayed on a screen of a display device 102. Main training information M has a story, and is preferably composed of moving pictures. The reproduction device continuously reads out and displays training information M along the story from the first recording medium 100. In such a continuous reproduction, if sub training information S which relates to the contents of main training information M displayed at that time is recorded in the first recording medium 100, the reproduction device 101 reads out and displays notice information Nm on the screen within the display of main training information M. Notice information thus displayed informs user that there is sub training information S corresponding to main training information M currently displayed. Notice information Nm is represented on the monitor in a manner being distinctive from main training information by position, formation, color, etc. at a relatively small area of the screen so as not to obstruct the display of main training information M. If user is interested in sub training information S, he or she finds out and opens a page or an area of the second recording medium 104 specified by notice information Nm displayed, and reads out desired reproduction control information P using the input device 103. The reproduction device 101 is Supplied with reproduction control information P thus read out, and controls reproduction of the first recording medium 100. One of the contents of reproduction control information is, for example, a command to reproduce sub training information Sm corresponding to notice information Nm currently displayed. When this command is executed during the display of main training information M, picture represented on the Screen of the display device 102 is changed from the picture A to the picture B as shown in FIG. 1, and sub training information Sm appears on the screen in place of main training information M. After seeing sub training information Sm thus displayed and getting knowledge from it, user selects reproduction Control information P, by the input device 103, which instructs returning to the previous display. In response, the screen again represents the picture A just before the change to the picture B, and display of main training information M is restarted along the story. After that, user can instruct, in the same manner, various reproduction controls, including display of sub training information Sm, by reading reproduction control information P during the representation of notice information Nm within the display of main training information M.

As described above, according to the present invention, main training information M is reproduced without harming main theme represented by story, concept of information, etc.

Next, a preferred embodiment of the present invention will be described below with reference to the accompanying drawings.

Figure 2:
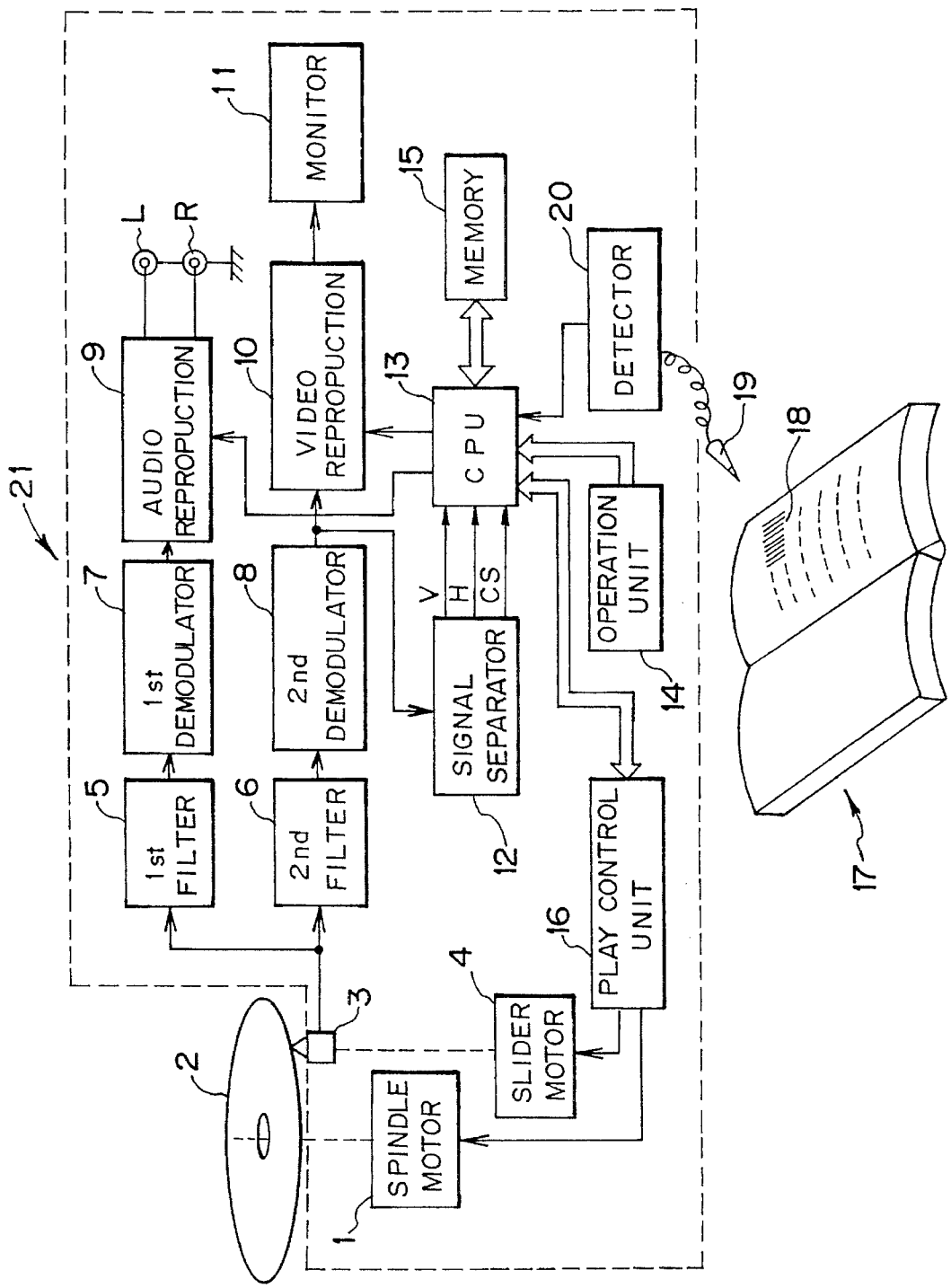
FIG. 2 is a block diagram illustrating a construction of interactive training system according to the present invention.

FIG. 2 illustrates a construction of an interactive training system utilizing training material according to the present invention. Firstly, details of the training material will be described. As shown in FIG. 2, the training material includes a video disk 2, such as LD, serving as first recording medium 100 and a textbook 17 serving as second recording medium 104. A reproduction system 21 reads out information from the video disk 2, displays picture information on a monitor 11 serving as display device 102 and outputs sound information from output terminals L and R. Bar codes 18 for indicating reproduction control information P are printed on the textbook 17. The bar codes 18 are read by a scanner 19 and used as commands for controlling operation of the reproduction system 21. As described later, information on the video disk 2 has correspondence with reproduction control information P on the textbook 17.

Figure 3:
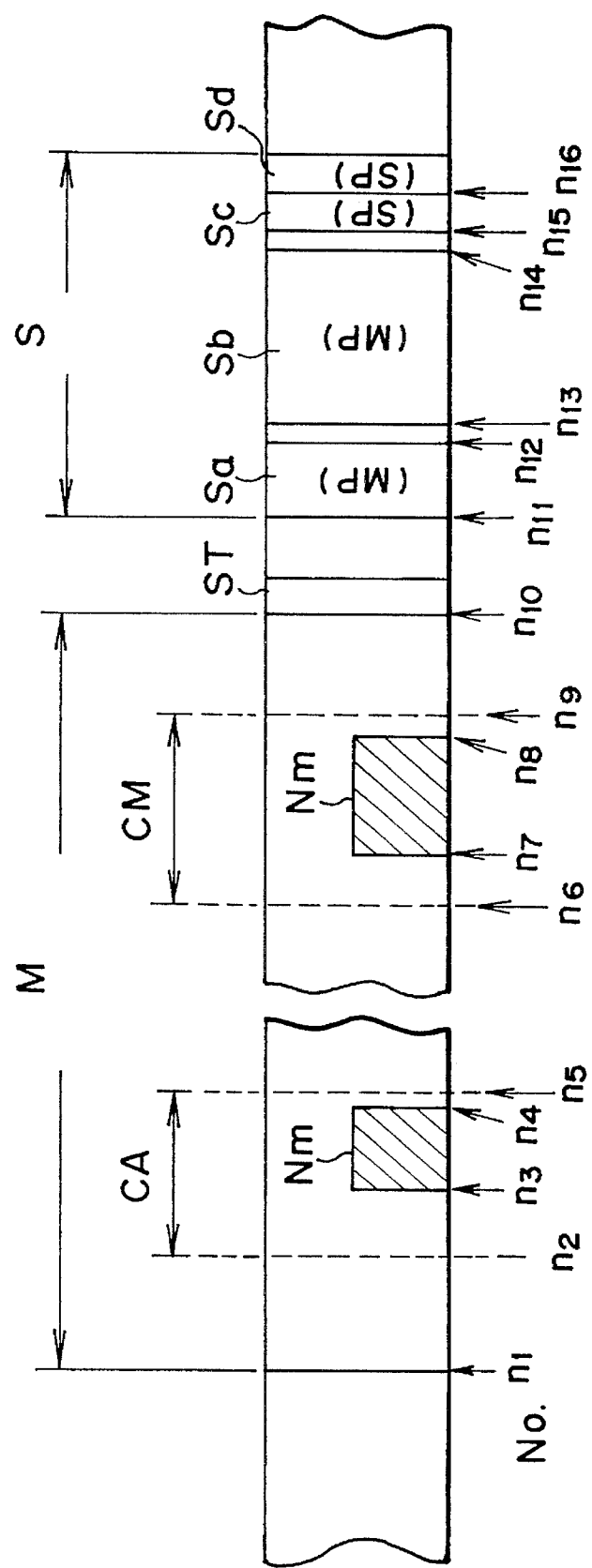
FIG. 3 is a diagram illustrating an allocation of training information recorded on a video disk.
Figure 4:
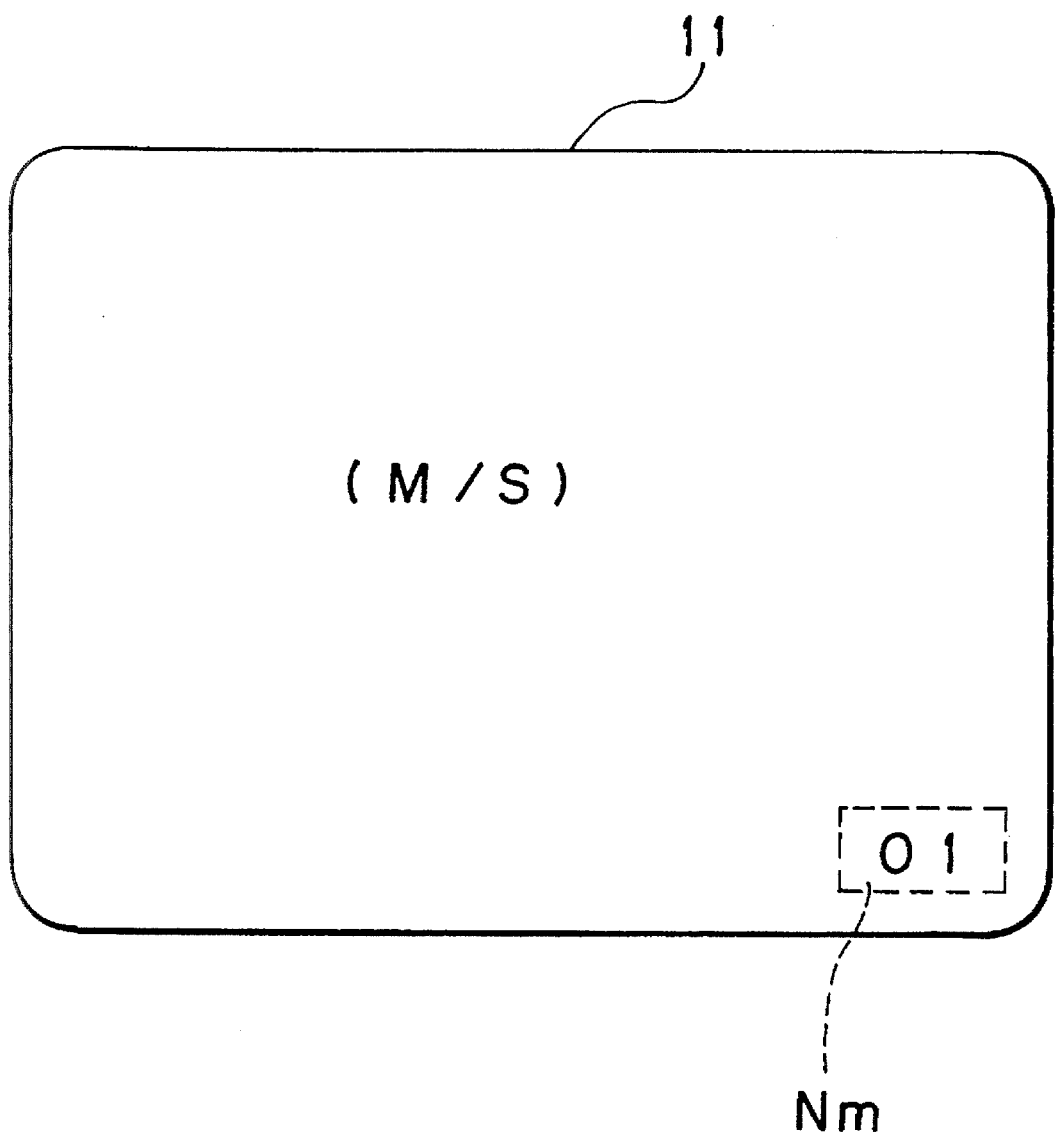
FIG. 4 is a diagram illustrating a manner of displaying information on a monitor.

FIG. 3 shows an allocation of training information recorded on the video disk 2. On one video disk 2, main training information M composed of moving pictures and sub training information S composed of moving pictures (MP) and/or still pictures (SP) are recorded in different recording areas. Stop code (ST) is recorded at the border of main training information M and sub training information S. The stop code is control code for preventing the reproduction system 21 from erroneously reproducing sub training information S after reproducing main training information M. Main training information M is composed of moving pictures, and its contents has a story. Namely, main training information M is constructed to present information successively along a training or teaching theme, like an educational program broadcasted by broadcasting station. This is distinctive from conventional system merely presenting fragmentary or scrappy information one after another. Main training information M is divided into a plurality of chapters CA–CM, and some or all of the chapters CA–CM include one or more notice information Nm. Notice information Nm indicates presence of sub training information S which corresponds to main training information M. Sub training information S is certain information relating to main training information M. For example, sub training information S is information which appears in the story of main training information M and is described in further detail if desired, or information providing some references of matters mentioned in main training information M. Notice information Nm has another function of notifying user of position on the textbook 17 on which reproduction control information P relating to sub training information S is printed. As illustrated in FIG. 4, notice information Nm is represented on the monitor 11 at an appropriate position (e.g., bottom right-hand corner in FIG. 4) in an appropriate manner (e.g., small) so as not to obstruct the display of main training information M. Accordingly, when notice information "01" is represented, it means that sub training information S is present at that time (during display of "01") and that reproduction control information P corresponding to it is listed in page "01" of the textbook 17.

Sub training information S is supplemental information relating to main training information M recorded in the chapters CA–CM, as described above, and is composed of moving pictures and/or still pictures, according to demands. As illustrated in FIG. 3, a start address and an end address are assigned, in a form of frame numbers, to main training information M, sub training information S, chapters CA–CM and notice information Nm. The reproduction system 21 performs various controls with reference to these frame numbers.

Figure 5:
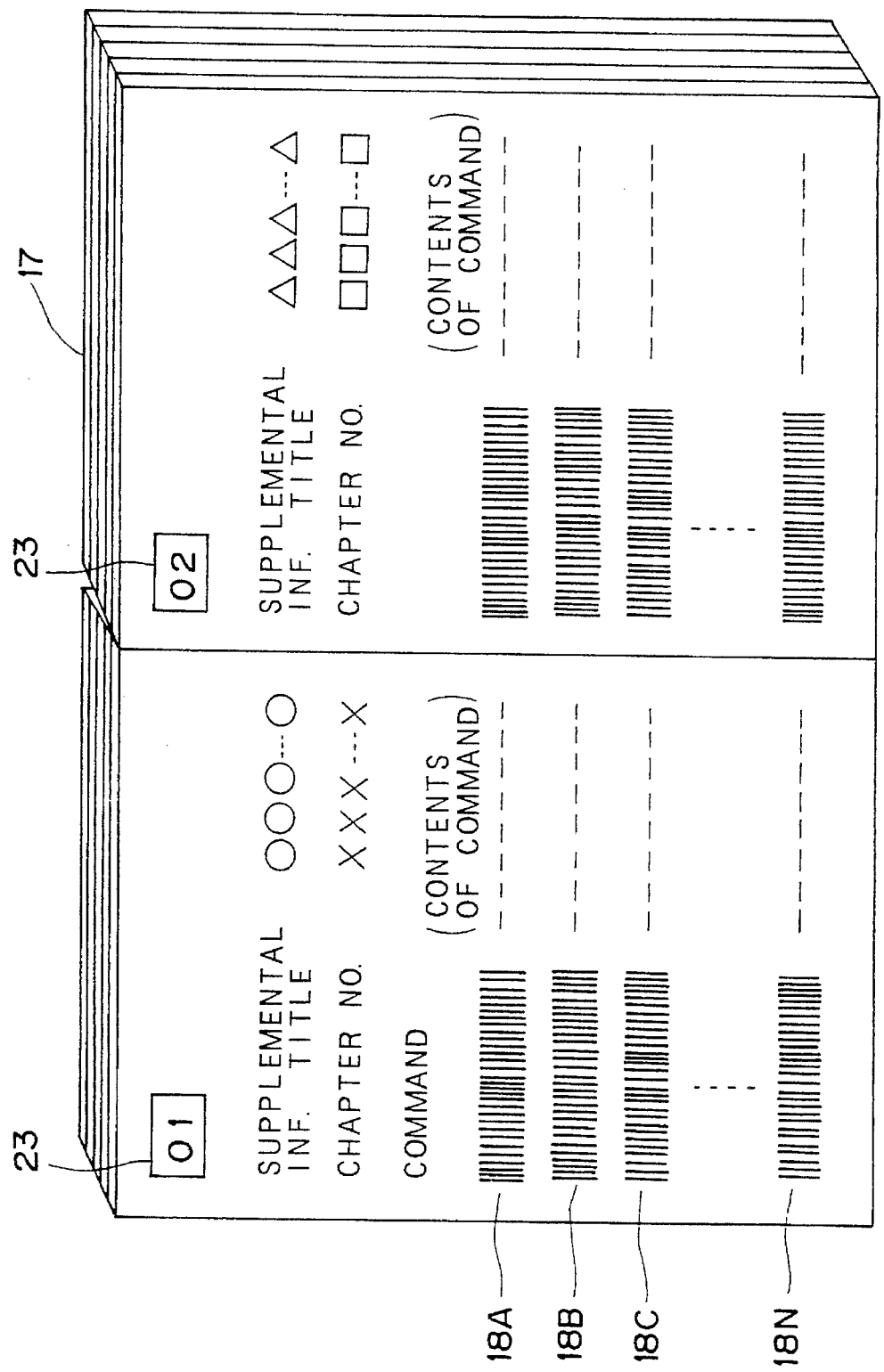
FIG. 5 is a diagram illustrating a feature of a textbook of training material.

As shown in FIG. 5, the textbook 17 is preferably in a form of printed matter such as bar code sheets or book, and control commands for controlling reproduction of sub training information S are represented in a form of bar codes 18A–18N. Somewhere in the textbook 17, preferably at a position which is easy to see by user, number of notice information Nm displayed on the monitor 11 ("01" in FIG. 5) is represented, as an indicator 23, to facilitate search of corresponding page by user. Next to the bar codes 18A–18N, contents of control commands are described, and user selects and scans the bar codes 18A–18N after recognizing the contents of the commands. FIGS. 6A and 6B illustrate examples of the control commands. Operations relating to them will be described later.

In FIGS. 6A and 6B, control commands are represented by sentences. However, this invention is not limited to this feature, and various alternations are applicable in consideration of contents of training material. For example, as shown in FIGS. 7A and 7B, control commands may be shortened and described by keywords relating to the object training such as order of writing, manner of drawing, etc. Alternately, control commands may be described by symbolic marks or figures, as shown in FIG. 7C.

Next, details of the reproduction system 21 will be described with reference to FIG. 2. Under a control of disk rotation system (components except for the monitor 11, operation unit 14 and detector 20), spindle motor 1 rotates turntable (not shown) on which the video disk 2 is disposed. As a video disk, there are known a Constant Angular Velocity (CAV) type disk and a Constant Linear Velocity (CLV) type disk. This invention is applicable to both types of disks. In addition, it is noted that this invention is also applicable to a Compact Disk or information recording disk of other type. Pickup 3 is supported by a slider (not shown) which is transferred in a radial direction of the turntable, and information detecting position (e.g., information reading spot in a case of optical pickup) is determined in the radial direction of the video disk 2. In addition, the reproduction system 21 is provided with various servo systems such as spindle servo system, focus servo system and tracking servo system. However, these are not shown and the description for them is omitted because they are well known techniques.

Modulated RF signal obtained by the pickup 3 is separated into audio channel component and video channel component by means of first filter 5 which passes only the audio channel component and second filter 6 which passes only video channel component. The audio channel component and the video channel component thus obtained are demodulated into audio signal and composite video signal by first demodulator 7 and second demodulator 8, respectively. Further, audio reproduction circuit 9 produces L-channel and R-channel audio signals, and supplies them to the L-channel and R-channel terminals. Video reproduction circuit 10 supplies video signal to the monitor 11. Signal separation circuit 12 extracts, from the composite video signal, V and H synchronizing signals and other control signals, and supplies them to CPU 13. In response to instructions from operation unit 14 such as keyboard, the CPU 13 performs appropriate operations based on data or programs stored in memory 15 such as ROM or RAM, and supplies control instructions to the audio reproduction circuit 9, the video reproduction circuit 10 and play control circuit 16. The bar codes 18 printed on the textbook 17 are read out by the scanner 19. Code signal thus obtained is detected by detector 20 and supplied to the CPU 13. The CPU 13 recognizes the code signal read by the scanner 19, and supplies command signals instructing play, pause or search to the play control unit 16. The CPU 13 also supplies instructions such as on/off switching instruction, monaural/stereo switching instruction or instruction for maintaining current status to the audio reproduction circuit 9, and supplies on/off switching instruction or instruction for maintaining the current status to the video reproduction circuit 10.

Next, an operation of the reproduction system 21 will be described. As shown in FIG. 2, when the video disk 2 is loaded, the pickup 3 reads out information from the video disk 2 and main training information M is displayed on the monitor 11. Now, assuming that main training information M recorded in an area between frames $n_3$ and $n_4$ in chapter CA is represented on the monitor 11 (see. FIG. 3), notice information Nm is also represented on the monitor 11 in a manner shown in FIG. 4. By this representation, user is informed that there is sub training information S which corresponds to training information M currently displayed., If user wishes to see sub training information S, he or she opens the page of the textbook 17 which is specified by notice information Nm currently displayed (page "01" in the case of FIG. 5). Then, user scans one of the bar codes 18 represented in the page. Assuming that user scans the bar code $18A_1$ (see. FIG. 6), the reproduction system 21 becomes search mode, transfers the pickup 3 to the position of the frame number $n_{11}$, and start reproduction of sub training information Sa. Accordingly, in place of main training information M, sub training information Sa is displayed on the monitor 11. Sub training information Sa thus displayed relates to main training information M displayed just before the appearance of sub training information Sa and is supplemental information, reference information or detailed information of main training information M. Therefore, user can get broader or more detailed knowledge of main training information M. When the reproduction of sub training information Sa is terminated at the position of frame $n_{12}$, the reproduction system 21 becomes command waiting status to receive further instruction. When user scans the bar code $18D_1$ shown in FIG. 6A, the pickup 3 returns to the position of frame $n_3$ and starts reproduction of main training information M from the position. Alternately, if user scans the bar code $18C_1$, reproduction of main training information M is started from the position of frame $n_2$, and user can review the chapter CA from the beginning once again.

In the above description, the reproduction system 21 represents still picture of the frame $n_{12}$ when the reproduction of sub training information Sa is completed. However, this invention is not limited to this feature. It is possible to control the reproduction system 21 to return to the position of the frame number $n_3$ automatically and reproduce main training information M from the position when the reproduction of sub training information Sa is completed. In connection with the reproduction of sub training information S, various controls can be performed. Some examples of the controls are represented in FIGS. 6A and 6B.

In the above described embodiment, it is possible to control the reproduction of the sub training information utilizing chapter number or subcode in place of the frame number. In addition, in place of bar code input system, other input systems can be used for inputting reproduction control information. In the above embodiment, main training information and sub training information are recorded on an identical recording medium. However, it is possible to record sub training information in a recording medium for exclusive use, such as LD, CD or ROM for sub training information only, and reproduce it using a reproduction device different from that for main training information.

As described above, according to the present invention, main training information, sub training information and notice information are recorded on the first recording medium while notice information and reproduction control information are recorded in the second recording medium, and information of the first and second recording medium are interrelated by notice information. Main training information is reproduced without harming main theme of information represented by story, concept of information, etc.

The invention may be embodied on other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning an range of equivalency of the claims are therefore intended to be embraced therein.

What is claimed is:

1. A training material comprising first recording medium and second recording medium, said first recording medium comprising:

a main training information recording area for recording main training information comprised of moving pictures and notice information on a time basis, said main training information recording area comprising an area for recording the notice information together with the main training information; and sub training information recording area for recording sub training information relating to the main training information recorded in the main training information recording area, said notice information indicating a presence of the sub training information corresponding to the main training information recorded in the main training information recording area; and said second recording medium comprising a reproduction control information recording area for recording reproduction control information for controlling reproduction of the main training information and the sub training information, the notice information corresponding to the reproduction control information.

2. A training material according to claim 1, wherein the main training information recording area comprises first areas for recording only the main training information and second areas for recording both the main training information and the notice information.

3. A training material according to claim 1, wherein the notice information specifies a part of the second recording medium in which reproduction control information for controlling reproduction Of the main training information recorded with the notice information and/or the sub training information corresponding to the main training information is recorded.

4. A training material according to claim 1, wherein the second recording medium comprises a printed matter, and the reproduction control information and the notice information are printed in the printed matter.

5. A training material according to claim 4, wherein the reproduction control information is recorded in a form of bar codes.

6. A training material according to claim 1, wherein the first recording medium comprises a video disk, and the reproduction control information comprises information for designating frame number or field number of video information.

7. An interactive training system operated in combination with a training material comprising first recording medium for recording main training information composed of moving pictures, sub training information relating to the main training information and notice information, and second recording medium for recording reproduction control information, said system comprising:

reproduction unit for reproducing the main training information and the sub training information to be displayed on a display unit;

input unit for reading out the reproduction control information from the second recording medium; and control unit for controlling the reproduction unit in accordance with the reproduction control information supplied from the input unit wherein said reproduction unit displays the notice information on the display unit with the main training information when the sub training information corresponding to the main training information is recorded in the first recording medium.

8. A system according to claim 7, wherein the second recording medium comprises a printed matter, and the reproduction control information and the notice information are printed in the printed matter.

9. A system according to claim 8, wherein the reproduction control information is recorded in a form of bar codes, and the input unit comprises a bar code scanner.

10. A system according to claim 7, wherein said reproduction unit displays the notice information at a part of a picture of the main training information on the display unit so as not to obstruct the display of the picture of the main training information.

11. A system according to claim 7, wherein the first recording medium comprises a video disk, and the reproduction control information comprises information for designating frame number or field number of video information.

12. A training material according to claim 1, wherein said main training information and said notice information are recorded on said main training information recording area in such a manner that said notice information is displayed at a part of a picture of the main training information displayed.

* * * * *